J. E. WHITE.
Corn Planter.
No. 104,088. Patented June 7, 1870.
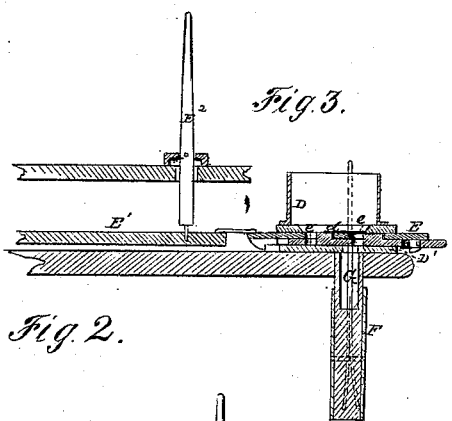
Fig. 3.
Fig. 2.
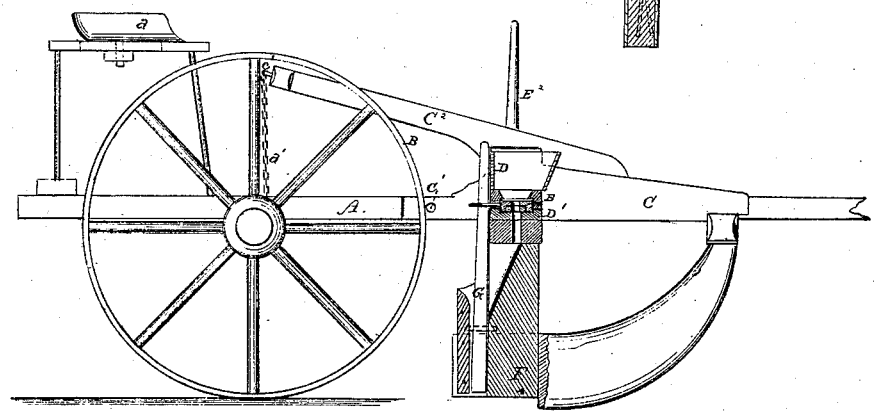
Fig. 1
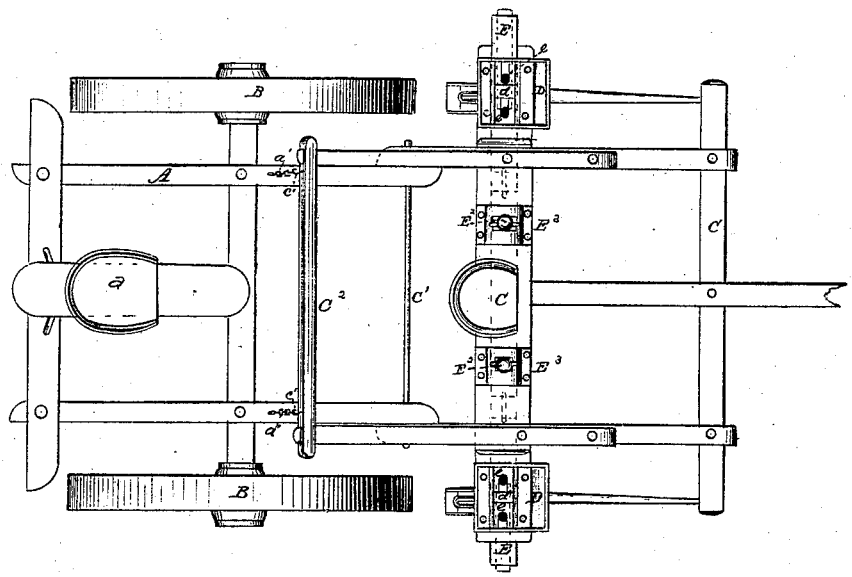
Witnesses:
B. Edw. J. Eils
F. Gomes
Inventor:
John E. White
by D. E. Somest Co.
His Attorneys

United States Patent Office.

JOHN E. WHITE, OF CLINTON, ILLINOIS.

Letters Patent No. 104,088, dated June 7, 1870.

IMPROVEMENT IN SEED-PLANTERS.

The Schedule referred to in these Letters Patent and making part of the same.

*To all whom it may concern:*

Be it known that I, JOHN E. WHITE, of Clinton, in the county of De Witt, and in the State of Illinois, have invented new and useful Improvements in Seed-Planters; and I do hereby declare that the following is a full, clear, and exact description thereof, reference being had to the annexed drawing making part of this specification, in which—

Figure 1 is a plan view of my improved corn-planter.

Figure 2 is a side elevation, one of the hoppers and dropping-mechanism being shown in section.

Figure 3 is a section through one of the seed-boxes in the direction of the reciprocating seed-slide.

The same letters are used in all the figures to designate identical parts.

My invention relates to a machine for planting corn or other seed, planted in rows and hills; and My improvement consists in the construction, combination, and arrangement of some of the parts constituting such a machine, as will be more specifically set forth in the following specification and claim.

To enable others skilled in the art to make and use my invention, I will proceed to describe its construction and operation.

A, in the drawing, represents the main frame of the planter, made of longitudinal and transverse beams firmly bolted together and mounted upon wheels, B, in the ordinary manner.

Upon this portion of the frame a seat, $a$, is arranged for the driver to sit upon.

C is another frame, hung to the front end of the main frame by means of a shaft or bolt, C', upon which the seed-boxes and dropping-mechanism are arranged, it being provided with a seat, $c$, upon which the person who is to operate the seed-slides sits.

A portion of this frame is made to overhang the main frame, extending back to just in front of the driver's seat, as shown at $C^2$, in figs. 2 and 1, it being for the purpose of vibrating the frame C and mechanism it supports on the axis $C^1$, in order to raise the colters above, or lower them into the ground.

Hooks, $c'$, are secured in the rear end of the portion $C^2$ of the frame C to be attached to chains, $a'$, fastened on the axle of the machine, so that said frame may be stationed at any desired point.

Upon a cross-beam of the frame C the seed-boxes D D are placed, one in front, or nearly so, of each wheel.

Between the bottoms of such boxes and the cross-beam supporting them, a plate of wood or metal, D', is placed, with a central aperture, directly above the seed-spout.

A groove or recess is formed in the upper surface of this plate to receive the seed-slide E, which is constructed with two apertures, $e\ e$, the size of which can be regulated by a slide and screw in the ordinary manner.

A thin plate of metal of sufficient width to cover one of the apertures in the seed-slide is placed over the latter in the bottoms of the seed-boxes, as shown at $d$, it being placed directly over the aperture in the plate D', so that as one of the seed-slide apertures is brought opposite the hole in said plate, it will discharge the seed, but the plate $d$ will not permit any seed to escape into the spout directly from the hopper or box.

The seed-slides operate in the same horizontal line, and are connected by a connecting-bar or rod, $E^1$, which is reciprocated by the levers $E^2$ in the hands of the operator, said levers being pivoted in blocks, $E^3$, upon a cross-bar of the frame C, as shown in figs. 1 and 3.

F F are the seed-tubes, through which the seed is discharged into a furrow made by suitable colters, F', arranged upon their lower front ends, as clearly shown in fig. 2.

By reference to the last-mentioned figure, it will be seen that the passages in the seed-tubes are not straight down, but are carried to the rear for some distance, so that the straight vertical portion may be in rear of the seed-boxes, and, this portion being left open on top, be open to the inspection of the operator at all times.

G is a vibrating flat bar of thin metal, sheet steel being preferred, pivoted in the straight portion of the seed-tube passage, and at its upper end attached to a stud secured to the seed-slide. The lower end extends to near the bottom of the said tube, and the bar is in this portion forked, as shown in dotted lines in fig. 3, and made sufficiently wide to stretch across the passage, which, in this part at least, should be made square. As the seed-slides are reciprocated, these bars are vibrated, so that the seed discharging is directed into that side of the tube which is closed by one of the flaps of the bar G, to be kept therein until the bar is vibrated in the opposite direction, when the seed already in the bottom of the seed-tube falls into the hill at the same time that another cupful is deposited in the opposite side of such tube, to be held therein by the other flap of the vibrating-bar until the next hill is reached.

What I claim as new, and desire to secure by Letters Patent, is—

The vibrating-bars G, seed-tubes F, hoppers D, seed slides E, connecting-rod $E^1$, levers $E^2$, and hinged frame C, all combined, arranged, and operating substantially as described.

The above specification signed by me this 27th day of December, 1869.

JOHN E. WHITE.

Witnesses:
JOSEPH J. KELLY,
JOHN WARNER.